Figure 1:
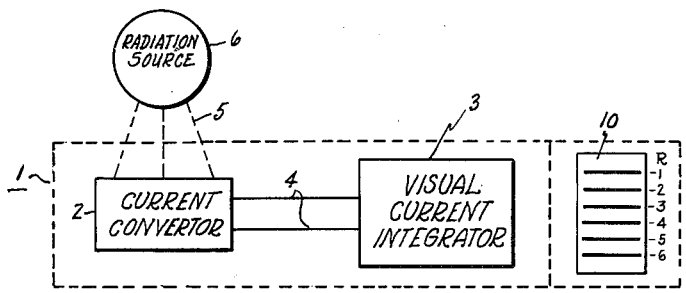

Inventors
Roger A. Dewes
Edmund E. Goodale
by Paul A. Frank
Their Attorney

United States Patent Office 3,198,945
Patented Aug. 3, 1965

3,198,945
RADIATION DOSIMETER PROVIDING A VISUAL REPRESENTATION OF TOTAL DOSE
Roger A. Dewes and Edmund E. Goodale, Scotia, N.Y., assignors to General Electric Company, a corporation of New York
Filed May 16, 1961, Ser. No. 110,522
5 Claims. (Cl. 250—71.5)

The invention relates to radiation dosimeters and, more particularly, to a radiation dosimeter which provides a visual indication of a total radiation dose to which the dosimeter is subjected.

A dosimeter is an instrument for indicating the dosage of radiation impinging upon the device. Dosimeters are used to indicate radiation levels and total radiation doses in regions which may be subject to radiation; such as, for example, in laboratories and around atomic installations. Dosimeters known in the prior art include such devices as ionization chambers and photographic film indicators.

It is frequently desirable to provide a compact, easily portable dosimeter suitable for carrying by a person who must be in a region of radiation. Heretofore, the personal dosimeters used have been modifications of conventional laboratory instruments such as an ionization chamber or a photographic film badge. Ionization chambers are costly, fragile and bulky and, therefore, are not well suited to individual personal use. Film badge indicators, while being satisfactory with respect to size and weight, are not readily readable, since after exposure the film must be developed and calibrated against standard exposed film representative of different radiation dosages before a reading can be obtained from such dosimeters.

It is, accordingly, an object of this invention to provide an improved dosimeter.

It is another object of this invention to provide an improved dosimeter for providing a visual representation of the total dose of radiations having impinged upon the dosimeter.

It is another object of this invention to provide an improved dosimeter which can be instantly read.

It is yet another object of this invention to provide an improved dosimeter which is compact and easily portable such that it is suitable for carrying by a person.

In accordance with the invention, means are provided for establishing an electric current whose magnitude is proportional to the instantaneous intensity of the radiation impinging on the dosimeter. This current may be obtained by first converting the radiation to light whose intensity is proportional to the intensity of the radiation and then converting the resulting light to an electric current whose magnitude is proportional to the intensity of light. The radiation may be converted to light by providing a suitable phosphor crystal; such as, for example, a sodium iodide phosphor crystal which emits light in the visibile spectrum when it is exposed to nuclear radiation. The resultant light may then be converted to an electric current by a suitable photovoltaic cell in optical relation with the phosphor crystal. The current output of the photovoltaic cell is thus proportional to the intensity of radiation impinging upon the phosphor crystal. The integrated output current of the photovoltaic cell, that is to say the total output charge of the photovolatic cell is a measure of the total radiation dose having impinged upon the phosphor crystal. The total output charge of the photovoltaic cell may be measured by passing the output current through a suitable chemical substance whose visible properties; for example, color, change in response to the total electric charge having passed therethrough and then measuring the change in visible properties of the chemical substance. For example, the output current may be passed through an iodide solution, thereby liberating free iodine, with the amount of iodine liberated being proportional to the total electric charge passing therethrough. The liberated iodine causes a change in the color of the solution, the change in color, which is an indication of the total radiation dose impinging upon the phosphor crystal, being easily measured by comparison with established color standards.

Figure 2:
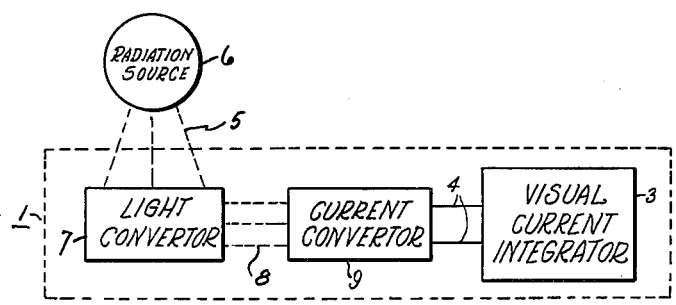
Figure 3:
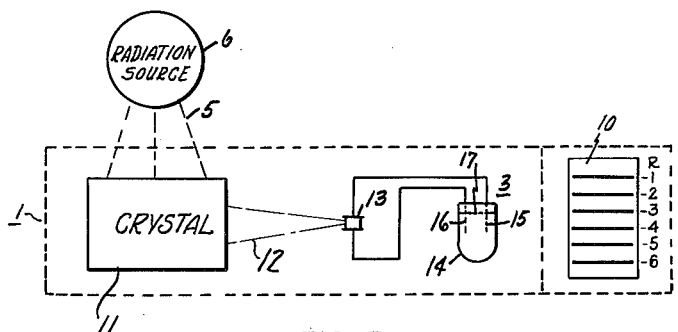

For a complete understanding of the invention, reference may be had to the accompanying figures, in which FIG. 1 shows, in block diagram form, one embodiment of a radiation dosimeter according to the invention;

FIG. 2 shows, in block diagram form, a second embodiment of a radiation dosimeter in accordance with the invention, and FIG. 3 shows, in schematic and circuit diagram form, a radiation dosimeter in accordance with the invention.

FIG. 1 shows, in block diagram form, a radiation dosimeter 1 according to the invention which includes a current converter 2 for converting any radiation impinging thereupon to an electric current whose magnitude is proportional to the instantaneous intensity of the radiation. The dosimeter 1 also includes a visual current integrator 3 which provides a visual indication of the integral of the current output of current converter 2. Current converter 2 and visual current integrator 3 are electrically connected in series through conductors 4.

The operation of the dosimeter may be explained as follows. Any nuclear radiation 5, which may originate at any radiation source 6, in impinging upon the current converter 2, converts the impinging radiation 5 into an electric current whose magnitude is proportional to the instantaneous intensity of the radiation 5. This current is supplied through conductors 4 to visual current integrator 3. Since the magnitude of the current is proportional to the magnitude of the instantaneous intensity of radiation 5, the integral of the current is proportional to the integral of the instantaneous intensity of radiation 5 and thus is a measure of the total radiation dose impinging upon dosimeter 1.

Current converter 2 may be any of the semi-conductive devices known in the art which produce an electric current when exposed to a nuclear radiation field. The converter 2 may be, for example, germanium or silicon, from which an electric current may be obtained in response to beta or gamma radiation. Visual current integrator 3 may be any means for passing an electric current through a chemical which undergoes some visual change, usually a change in color, in response to electric charge passing therethrough. For example, visual current integrator 3 may be means for passing electric current through an iodide solution, whereby iodide ions are liberated into free iodine in a quantity proportional to the total electric charge passing therethrough, thereby causing a change in the color of the solution in response to the integral of the current passing therethrough. The color of the iodide solution may then be compared to a predetermined standard 10 to determine the total radiation dosage impinging upon dosimeter 1.

FIG. 2 shows a second embodiment of a dosimeter in accordance with the invention which is similar to the embodiment shown in FIG. 1 except that radiation is first converted into light, which is in turn converted into an electric current, rather than the radiation being converted directly into an electric current. In FIG. 2 radiation 5 from a source 6 impinges upon a light converter 7 which converts the radiation into visible light 8 whose intensity is proportional to the instantaneous intensity of radiation 5. Light 8 impinges upon a current converter 9, which is optically coupled to light converter 7 and which converts the light into an electric current whose magnitude is proportional to the intensity of the light. The electric current so produced is connected through conductors 4 to a visual current integrator 3 similar to the one described in FIG. 1. The operation of this circuit would be the same as that described for FIG. 1 except that now the radiation is first converted to light, which is in turn converted to an electric current whose magnitude is thus proportional to the instantaneous intensity of the radiation impinging upon the dosimeter 1.

FIG. 3 shows a radiation dosimeter such as was described in FIG. 2. Radiation 5 from a source 6 impinges upon a crystal 11 which emits light 12 whose intensity is proportional to the instantaneous intensity of the radiation 5. Crystal 11 may be any material which, when subjected to nuclear radiation, emits light whose intensity is proportional to the instantaneous intensity of the nuclear radiation. For example, crystal 11 may be a thallium activated sodium iodide phosphor crystal. The light 12 from the crystal 11 is optically coupled to a photovoltaic cell 13, which may be, for example, a germanium photovoltaic cell. The output current of the photovoltaic cell 13 is supplied to a visual current integrator 3, which may be a vial 14 having electrodes 15 and 16 therein and which is filled with a chemical solution 17 such as potassium iodide which changes color in response to electric charge passing therethrough. The electric current output from photovoltaic cell 13 is serially connected to electrodes 15 and 16. The current passing through solution 17 thereby liberates free iodine, causing a change in the color of solution 17, with the amount of change being dependent upon the amount of iodine liberated, and thus upon the total electrical charge passing through solution 17. The color of solution 17 may then be compared to a predetermined color standard 10 to obtain an indication of the total radiation dosage having impinged on crystal 11.

Of course, any means for providing an electric current in response to radiation may be used with the invention. For example, photovoltaic cell 13 could be replaced by a photoconductive device in series with an electrical energy source. Also, visual current integrator 3 may be any other means for providing a visual indication of the total charge output of photovoltaic cell 13. For example, the visual current integrator 3 could be a solion liquid diode such as described in the McGraw-Hill publication Electronics, vol. 32, No. 9, of February 27, 1959.

A dosimeter for integrating a total radiation dose can thus be made which is compact and easily portable to facilitate wearing by a person. The dosimeter comprises a phosphor crystal positioned adjacent a photovoltaic cell. The output of the photovoltaic cell is serially connected to a simple visual current integrator as described. A predetermined color standard may be positioned adjacent the visual current integrator so that an inspection of the visual current integrator will show the total radiation dosage to which the dosimeter has been subjected.

While the invention has thus been described and several embodiments shown, it is not intended that the invention be limited to these shown embodiments. Instead, many modifications will be apparent to those skilled in the art which lie within the spirit and scope of the invention. For example, any suitable means for effecting the described conversions may be used with the invention and any suitable visual current integrator for providing a visual indication of the total current flow may be used. It is thus intended that the invention be limited in scope only by the appended claims.

What we claim as new and desire to secure by Letters Patent of the United States is:

1. A radiation dosimeter comprising first means for providing an electric current output proportional to the intensity of radiation, electric current responsive means to provide a color indication in response to the total electrical charge passed therethrough, and means to serially connect the output current of the first means to pass through said current responsive means whereby the color indication of said current responsive means is indicative of the total radiation dose to which the dosimeter is subjected.

2. A radiation dosimeter comprising a first element which emits light, the intensity of which is proportional to the intensity of radiation, a second element which provides an electric current output which is proportional to the intensity of light, means to optically couple said first element to said second element, an electric current responsive element to provide a color indication in response to the total electrical charge passed therethrough, and means to serially connect the current output of said second element to pass through said current responsive element whereby the color indication of said current responsive element is indicative of the total radiation dose.

3. A radiation dosimeter comprising a phosphor crystal which emits light, the intensity of which is proportional to the intensity of radiation, a photovoltaic cell which provides an electric current output which is proportional to the intensity of light, means to optically couple said phosphor crystal to said photovoltaic cell, a visual current integrator to provide a color indication in response to the total electrical charge passed therethrough, and means to serially connect the output current of said photovoltaic cell to pass through said visual current indicator whereby the color indication of said visual current integrator is indicative of the total radiation dose.

4. A radiation dosimeter comprising a phosphor crystal which emits light with an intensity proportional to the intensity of radiation impinging thereupon, a photovoltaic cell which provides an electric current output which is proportional to the intensity of light, means to optically couple said phosphor crystal to said photovoltaic cell, a visual current integrator to provide a color indication in response to the total electric charge passed therethrough, said visual current indicator comprising an iodide solution in which free iodine is liberated by the passage of an electric current therethrough to thereby change the color of said solution, and means to serially connect the output of said photovoltaic cell to pass through said iodide solution whereby the color of said iodide solution is indicative of the total radiation dose having impinged upon the dosimeter.

5. A dosimeter for personal wear to measure the total dose of radiation to which the wearer is exposed comprising a phosphor crystal which emits light with an intensity proportional to the intensity of radiation impinging thereupon, a photovoltaic cell positioned adjacent to said phosphor crystal to provide an electric current output which is proportional to the intensity of light impinging thereupon, a transparent container having an iodide solution therein, means to pass the output current of said photovoltaic cell through said iodide solution whereby free iodine is liberated in proportion to the total electric charge passing therethrough to thereby change the color of said solution, and a predetermined color standard positioned adjacent said transparent container whereby an indication of the total radiation dose having impinged upon said phosphor crystal may be observed in terms of color of said solution.

References Cited by the Examiner

UNITED STATES PATENTS

| | | | |
|---|---|---|---|
| 2,564,626 | 8/51 | MacMahon et al. | 250—83.3 |
| 2,650,309 | 8/53 | Webb et al. | 250—71.5 |
| 2,708,242 | 5/55 | Ruber | 250—83 |
| 2,768,308 | 10/56 | Schultz | 250—83.3 |
| 2,832,734 | 4/58 | Eckfeldt | 204—195 |
| 2,858,447 | 10/58 | Taplin | 250—83 |
| 2,885,562 | 5/59 | Marinace | 250—83.3 |
| 2,899,560 | 8/59 | Nemet | 250—71.5 |
| 2,902,604 | 9/59 | Baldwin | 250—83.3 |
| 2,957,080 | 10/60 | Schulte et al. | 250—83 |
| 2,991,363 | 7/61 | Rosenthal | 250—83.3 |
| 3,030,510 | 4/62 | Reeder | 250—83.3 |

References Cited by the Applicant

UNITED STATES PATENTS 2,664,511    12/53    Moos.

RALPH G. NILSON, *Primary Examiner.*

G. R. OFELT, ARCHIE R. BORCHELT, *Examiners.*